UNITED STATES PATENT OFFICE 2,534,787

COMPOSITION FOR THE TREATMENT OF PLANTS AND METHOD OF USING SAME

Sebastian B. Mecca, Fox Chase Manor, Pa., assignor to Schuylkill Chemical Company, Philadelphia, Pa., a corporation of Delaware No Drawing. Application February 25, 1947, Serial No. 730,751

10 Claims. (Cl. 71—2.4)

The present invention relates to a composition capable of reducing and eliminating chlorosis in plants suffering from the same, and to a method of treating chlorotic plants, and more particularly the invention relates to a composition by which both a chlorophyll derivative in a usable form and anti-chlorotic elements may be supplied to plants in which there is a deficiency of chlorophyll and the elements that are necessary for the production and utilization of chlorophyll in the plant.

Chlorosis, directly caused by deficiency of chlorophyll and initially indicated by yellowing of the leaves of plants, is a condition which presents many serious problems to growers as well as to retail florists and others who are interested in maintaining healthy plants. The condition manifests itself by the loss of the green color in the leaves of plants, and the leaves will turn yellow or even brown. If chlorosis is allowed to progress further, the entire plant becomes affected and the leaves will fall off, resulting in the ultimate death of the entire plant.

Many factors contribute to chlorotic condition in plants. For instance, lack of sufficient sunlight may retard or eliminate the production of chlorophyll. However, a more predominant cause of chlorosis, and one which affects florists and home growers, is the deficiency or lack of the various elements necessary for the development of chlorophyll. The production of chlorophyll and its constant replacement depends upon the presence of vital elements normally absorbed by the roots and assimilated in the stems and leaves of plants. Varying soil conditions often limit the presence of these elements, either through lack or deficiency of such elements therein, or because the elements are in non-assimilable form, for example, in the form of water-insoluble compounds. As is well known, one of the principal causes of chlorophyll deficiency in plants is the lack of iron, which is necessary for the formation, development, and activity of the chlorophyll. Similarly, such elements as zinc and manganese are vital to the formation and functioning of chlorophyll in the plant. It is known that a deficiency of one or more of these vital elements may retard or prevent chlorophyll development, resulting in chlorosis.

Various methods for treating chlorotic plants have been suggested. These methods are all based on overcoming the primary cause of chlorosis, namely, the deficiency of the various important anti-chlorotic elements. For example, the application of water-soluble compounds of the necessary elements to chlorotic plants by spraying, or to the soil surrounding the roots of the plants is well-known. In time, through the natural function of the plant, the production of chlorophyll in the affected areas may take place following the addition of the elements in which the plant is deficient. However, since, in the affected areas there is already a deficiency of chlorophyll, it can be seen that the activity of that area in utilizing the added elements may be insignificant or greatly retarded, and in plants where relatively large areas have become seriously deficient in chlorophyll, the addition of the anti-chlorotic elements, iron, manganese, and zinc, alone may have little or no effect.

As stated, while in many cases the application of the necessary anti-chlorotic elements alone to the plant will in time overcome chlorosis, the desired action is often times slow. Obviously, there are many occasions where it is necessary for florists and growers to quickly revive chlorotic plants. While I have observed that a chlorophyll derivative applied to chlorotic plants causes a healthy green color to reappear relatively quickly at the previously chlorotic areas, such results are often not permanent.

In contrast to this transient effect provided by the use of a chlorophyll derivative alone and the slow and often insignificant effect obtained by the use of anti-chlorotic elements alone, the present invention furnishes a composition by which the chlorotic condition in plants may be overcome rapidly and completely and the plant thus restored to a healthy state. This result is not effected by merely a temporary coloring or "dyeing" of the chlorotic areas by the chlorophyll derivative but is obtained by the relatively rapid stimulation of the chlorophyll-deficient tissues in the chlortic area so that chlorophyll will be rapidly produced within the tissues by the action of the added chlorophyll derivative and the anti-chlorotic element or elements.

The principal object of this invention, therefore, is to provide a relatively inexpensive composition by which chlorosis in plants may be greatly reduced or entirely eliminated in a relatively short time.

Other objects, including the provision of a method by which plants suffering from chlorosis may be restored to a healthy condition, will be apparent from a consideration of the specification and the claims.

In accordance with the present invention, there is provided a composition comprising a water-soluble metallic salt of the parent chlorophyll structure and a compound furnishing in plant-assimilable form a plant anti-chlorotic element selected from the group consisting of iron, zinc, and manganese. Advantageously, the compound furnishing the anti-chlorotic element in plant-assimilable form will be selected to provide the element that is lacking in the medium in which the plant is growing and, in many cases, the composition will comprise, in addition to the chlorophyll salt, a compound furnishing two or three of the elements necessary for chlorophyll formation in the plant.

As stated above, the basic cause of chlorosis in plants is the deficiency of various elements necessary to the production, development and activity of chlorophyll in stems and leaves of plants. Consequently, it is also the immediate lack or deficiency of cholrophyll that results in the loss of green color and the cessation of the vital functions of the plant at the affected area. The addition of chlorophyll and the various antichlorotic elements not only removes the basic cause of chlorosis, but also supplies to the affected area chlorophyll in a form readily usable by the plant, thereby stimulating the activity of that area in the utilization of the added antichlorotic element or elements and causing a more rapid and permanent recovery.

In accordance with this invention, all types of living plants may be treated. The size of the plant is immaterial, and the term "plant" is used herein to include plants from the smallest greenhouse variety to large trees.

As is known, chlorophyll, as it is extracted from green plants, is a magnesium salt of the parent structure of chlorophyll, soluble in alcohol and oils. Such naturally-occurring chlorophyll is made up of two magnesium salts, chlorophyll-$a$ and chlorophyll-$b$, and the term "naturally-occurring chlorophyll" is used herein to refer to a product comprising the two components. Various metallic salts of the parent chlorophyll structure obtained by replacing the magnesium with various metals may be used, if desired. For example, by replacing the magnesium with sodium, a water-soluble chlorophyll derivative may be obtained, known as sodium chlorophyllin. Similarly, sodium copper chlorophyllin is a water-soluble chlorophyll derivative. Other examples of water-soluble salts are the potassium salts, and the double salts of sodium or potassium and a metal such as zinc, iron, and manganese. As may be seen, various chlorophyll derivatives are obtainable, which differ from each other in the metallic element or elements substituted for the magnesium in the naturally-occurring chlorophyll. In accordance with the invention, the use of a water-soluble chlorophyll salt is preferred and suitable methods are set forth hereinafter by which the water-soluble derivatives may be utilized. The chlorophyll salt in the form of a water solution or in the form of a concentrate which exists as a pasty mass containing the chlorophyll salt and a limited amount of water, may be mixed with the compound furnishing the iron, zinc and/or manganese to the plant. Obviously also if a solid chlorophyll salt is available, it may be used. The chlorophyll salt need not be pure or relatively pure but may be associated with other materials, for example, the product may be associated with the colloidal proteins and pigments which together with the chlorophyll make up the chloroplasts of the plant.

Referring to the compound furnishing iron, zinc, or manganese to the plant, any inorganic or organic compound which contains the element in a sufficiently water-soluble form to be assimilable by the plant may be used. As stated, in many instances under various soil conditions, the plant may be deficient in only one of the above-mentioned elements, whereas in other instances, the plant may require the use of two or even three of the elements. The element or elements employed and the amounts thereof will, therefore, be determined by the conditions peculiar to the plant or plants requiring treatment.

Since in chlorotic plants the deficiency is usually in iron, it is advantageous to include an iron compound in the composition and then to add thereto also a zinc or manganese salt or both, when the plant to be treated is deficient in the other element or elements. In each case, however, the composition will comprise a water-soluble metallic salt of the parent chlorophyll structure for application to the affected plant along with the compound furnishing the antichlorotic element or elements.

Examples of water-soluble iron salts that may be used in accordance with this invention, in conjunction with the chlorophyll derivative are: ferrous chloride, ferrous nitrate, ferrous sulphate, ferrous ammonium sulphate, ferric acetate, ferric chloride, ferric nitrate, ferric sulphate, ferric citrate, sodium ferric citro-phosphate, ferric ammonium citrate, ferric glycero-phosphate, sodium ferric citro-pyrophosphate, ferric tartrate, ferric lactate, ferric glyconate and the like. The corresponding salts of manganese and zinc are examples of salts furnishing these elements. Examples of double salts furnishing two of the elements are ferric-zinc, ferric-manganese, and zinc manganese citrate and the double salts of chlorides and sulphates. Of especial advantageous utility, where chlorosis is due to iron deficiency, is the complex iron compound, ferric-potassium-ammonium-citro-phosphate. So far as I am aware, this compound is new and has the advantage (in the treatment of plants for example) of furnishing not only the iron but also other important nutrients in easily assimilable form. This compound may be prepared by oxidizing an aqueous solution of ferrous sulphate by sodium chlorate or other oxidizing agent; adding a solution of a soluble phosphate, such as sodium phosphate, to form ferric phosphate; separating the ferric phoshate from the solution and treating it with citric acid, potassium citrate, and ammonium citrate; and evaporating the solution. In the preparation of the preferred composition, the water-soluble chlorophyll salt is added to the syrupy solution after the partial removal of the water therefrom, followed by the removal of the water to form a co-solidified mixture.

In addition to supplying the iron, zinc, or manganese, the compound furnishing one or more of these elements may also furnish other elements helpful in plant growth, for example, nitrogen, potassium, phosphorus, magnesium and calcium. Furthermore, if desired, the composition may also include other compounds favorably influencing plant growth, for example, plant food materials, hormones, cell proliferants such as allantoin, urea or thiourea, and the like.

The composition of the present invention may be made available in any desired form, for example, in the form of a solid, a solution, or an emulsion. In making up the solid composition, it is advantageous to include a diluent or extender such as sugar or dextrose, and if the composition is to be in the form of a pellet or pill, a binder such as a water-soluble gum, for example gum acacia, will also usually be employed. If desired, corn or cane syrup may be included. Since the metallic salt of the parent chlorophyll structure and the compound furnishing the iron, zinc, or manganese are both water-soluble, a solution may be readily prepared. Since both the chlorophyll salt and the compound furnishing the iron, zinc, or manganese are water-soluble, a convenient method of making the composition is to evaporate an aqueous solution containing one or more of the compounds furnishing iron, zinc, or manganese to form a syrupy liquor and then to add thereto a water-soluble metallic salt of the parent chlorophyll structure dissolved in a small amount of water. Thereafter, the mass is mixed and allowed to dry to form solid. The co-solidified solid so obtained may then be used as such or be dissolved in water to form a solution or may be used to form pellets or pills.

The relative amounts of the metallic salt of the parent chlorophyll structure and of the compound or compounds furnishing the iron, zinc and/or manganese may vary within wide limits since a large excess of one of the components of the mixture does not have any deleterious effect on the action of the composition. In any composition, the chlorophyll salt will be present in an amount not less than .01% based on the total amount of the element or elements (iron, zinc and/or manganese) and the element or elements will be present in an amount not less than 5% based on the chlorophyll salt. Due to the expense of the chlorophyll salt, however, that salt is usually present in an amount less than the element or elements; for example, a mixture is advantageously prepared where the amount of chlorophyll salt is from .01% to about 40% based on the total amount of the element or elements. Generally, about 1% to about 28% of the chlorophyll salt, and preferably about 5% to about 15%, based on the element or elements will be employed. The chlorophyll is advantageously present in an amount less than the total of the element or elements when the compound is to be prepared in the form of a solid due to difficulties encountered in the preparation of the solid where the amount of chlorophyll exceeds the element or elements. The figures given above are advantageously used in the preparation of a solid product. When a product is prepared in the form of a solution, if the cost of the chlorophyll salt may be disregarded, the chlorophyll salt may (as indicated above) be present in amounts in excess of the total of the element or elements; for example, as stated, the element or elements may amount to only 5% of the chlorophyll salt but even in this type of composition, the amount of the element or elements will usually not be less than about 10%-20% based on the weight of the chlorophyll salt.

The concentration of the two active components in the composition may vary from one in which the active components make up all or substantially all of the composition, as may be the case when the composition is a solid, to one in which the active components are present in only minor amounts, the remainder of the composition being diluents, extenders, water, oil, and the like. The composition marketed may be applied directly to the plant or the composition may, before use be diluted if a liquid, or dissolved in a solvent if a solid. In the preferred embodiment, a water-soluble composition is prepared in solid form for marketing.

The application of the composition of the invention to the plant may be accomplished in a number of ways. For example, a solution of the composition may be applied to the affected areas of the plant, for example, by spraying. This method is especially desirable for application to smaller plant structures such as flowers, potted plants, and shrubs. Similarly, an emulsion, may be applied to the chlorotic areas, for example, by spraying or sprinkling. Alternatively, the solution, emulsion, or the solid composition may be applied to the soil surrounding the roots of the chlorotic plant.

In applying such mixtures, there are no critical limits regarding the concentration of the compositions comprising the metallic salt of the parent chlorophyll structure and the compound furnishing the iron, zinc and/or manganese. In spraying the leaves of plants, the concentration of the composition in the emulsion or solution will generally vary from about 0.1% to about 10%, preferably a concentration of from about 1% to about 5% being employed. On the other hand, mixtures applied to the soil surrounding the roots of the affected plant may be more concentrated, owing to their subsequent dilution by the water in the soil and in the plant itself and, as stated, the solid composition may be applied to the soil. Subsequent applications of the composition may be made from time to time depending upon the extent of the chlorosis in the affected plant and the rate of recovery.

In treating larger plant structures such as trees, large shrubs, and the like, a desirable method of application is by means of a water-soluble pellet or pill of the composition comprising the two components only or the two components diluted with a solid extender, such as dextrose and the like. These pills may be applied to the larger portions of the plant, for instance, the branches and/or trunk, by merely inserting one or more pills in holes bored therein. Holes may be bored at varying intervals and the number of pills inserted will depend upon the seriousness of the chlorotic condition of the particular plant. Preferably, as in the case of sprays, a water-soluble composition will be employed in making up the pill. The ascending plant solution will dissolve the pills carrying the composition to the chlorotic area to replace the chlorophyll lost as well as the elements necessary to the production of new chlorophyll, thus restoring the normal function of the leaf and plant structure.

In practicing the method, if desired, the chlorophyll derivative and the compound furnishing the iron, zinc, and/or manganese may be applied separately, for example, by the use of a solution of each applied one after the other. In such case, the second component is applied before the first has completely performed its function so that the synergistic effect will be obtained.

The following examples illustrate, but in no way limit, the composition, the preparation thereof, and the method of applying the composition to chlorotic plants in accordance with the present invention:

*Example 1*

Parts
Sodium chlorophyllin (water-soluble) _____ 1
Ferric - potassium - ammonium-citro-phosphate _____ 99

In the above formula 1 part of sodium chlorophyllin is used with 99 parts of the ferric-potassium-ammonium-citro-phosphate. Other water-soluble salts of chlorophyll may be used and the percentage of the chlorophyll salt to the ferric compound may vary from about 0.5% to about 5.0% with equally satisfactory results.

The ferric-potassium-ammonium-citro-phosphate employed in this example may be prepared as follows:

| | |
|---|---|
| Ferrous sulphate _____ lb __ | 1 |
| Water _____ cc __ | 6,000 |
| $H_2SO_4$ (concentrated) _____ cc __ | 20 |
| Sodium chlorate _____ g __ | 50 |
| Sodium phosphate (dissolved in 1,600 cc. hot water) _____ lb __ | 1 |
| Potassium citrate _____ g __ | 100 |
| Ammonium citrate (130 g. citric acid plus 80 cc. 28% $NH_3$) _____ g __ | 141 |
| Citric acid _____ g __ | 30 |

A solution of the ferrous sulphate, sulphuric acid, and sodium chlorate is prepared and the ferrous sulphate oxidized. To this oxidized solution, the sodium phosphate is added gradually with stirring. After the thus formed ferric phosphate has settled, the supernatant liquor is decanted and the residual ferric phosphate washed. To this ferric phosphate is added the citric acid and potassium citrate and finally the ammonium citrate. After the addition of 1,000 cc. of water, the mixture is gently heated with stirring and allowed to simmer until the solution becomes fairly dark green and only a small amount of undissolved ferric phosphate remains. The solution is allowed to stand over night, after which it is evaporated to syrupy consistency and then allowed to dry for between 6 and 8 hours under reduced pressure and low temperature. The resulting crystals of ferric-potassium-ammonium-citro-phosphate are screened through a 10 mesh sieve and collected for use.

The sodium salt of the parent chlorophyll structure is advantageously added to the above-mentioned syrupy iron-potassium-ammonium-citro-phosphate solution and the resulting mixture dried. In this case, the two components are co-solidified, that is, are converted into a solid in the presence of each other. The solid material thus obtained may be utilized in any convenient manner such as by being dissolved in water for application as sprays and the like, or as by being formed into pellets or pills as hereindescribed. An example of a spray is a water solution containing from 1 to 5% of the solid composition. In the preparation of a pill, one gram of the composition is ground and mixed with two grams of dextrose or powdered sugar and one-half gram of gum acacia. To this mixture, water is added drop by drop until a pasty mass is formed which can be formed by well known procedures, such as by rolling or compressing in a press, into pills or pellets and dried.

*Example 2*

| | Parts |
|---|---|
| Sodium copper chlorophyllin (water-soluble) _____ | .1 |
| Manganous sulphate _____ | .1 |
| Water _____ | 99.8 |

The chlorophyll salt and manganous salt are dissolved in water. The resulting solution is used as a spray for treatment of chlorosis due to manganese deficiency.

*Example 3*

| | Parts |
|---|---|
| Sodium iron chlorophyllin (water-soluble) ___ | 1 |
| Zinc sulphate _____ | 1 |
| Sugar or dextrose _____ | 6 |
| Acacia _____ | 2 |

The ingredients are mixed thoroughly and made into pills according to general pharmaceutical practice. These pills are inserted into holes bored into the trunk of chlorotic trees. Ten to twenty of such pills are used depending upon the size of the tree.

*Example 4*

| | Parts |
|---|---|
| Sodium chlorophyllin (water-soluble) _____ | 1 |
| Naturally occurring chlorophyll (oil-soluble) _____ | ½ |
| Acacia, tragacanth or other emulsifying agent _____ | 2 |
| Oil _____ | 4 |
| Water _____ | 92 |
| Ferric-potassium-ammonium-citro-phosphate (made as in Ex. 1) _____ | 2 |

An emulsion is made up of the ingredients according to general pharmaceutical practice, and may be used as a spray.

*Example 5*

| | Parts |
|---|---|
| Sodium copper chlorophyllin (water-soluble) _____ | .1 |
| Ferric ammonium citrate _____ | 2.0 |
| Water _____ | 97.9 |

The ingredients are dissolved in the water and the solution may be used as a spray.

*Example 6*

| | Parts |
|---|---|
| Sodium chlorophyllin (water-soluble) _____ | 2 |
| Ferric potassium citrate _____ | 98 |
| Zinc and manganous chloride _____ | 98 |
| Water _____ | 2,000 |

The iron, zinc and manganese salts are dissolved in water and the resulting solution is evaporated to a syrupy consistency. The sodium chlorophyllin is then added to the syrup and the mixture is dried at a temperature of 160° F. under a pressure of 26″ of mercury. The resulting solid may be applied to the soil surrounding plants, made into pills, or dissolved in water to make anti-chlorotic sprays.

*Example 7*

| | Parts |
|---|---|
| Sodium iron chlorophyllin (water-soluble) _ | .1 |
| Zinc sulphate _____ | .1 |
| Water _____ | 99.8 |

The ingredients are dissolved in the water and the resulting solution may be used as a spray.

*Example 8*

| | Part |
|---|---|
| Sodium copper chlorophyllin (water-soluble) _____ | .1 |
| Potassium phosphate _____ | .5 |
| Calcium nitrate _____ | .1 |
| Magnesium sulphate _____ | .1 |
| Ammonium sulphate _____ | .05 |
| Manganous sulphate _____ | .01 |
| Zinc sulphate _____ | .01 |
| Boric acid _____ | .01 |
| Iron and potassium citrate _____ | .1 |
| Water, sufficient to make 100 parts of solution | |

The ingredients are dissolved in the water and the resulting solution may be used as a spray. This composition, in addition to the anti-chlorotic components, includes nutrients for the general health of the plant treated.

*Example 9*

| | Part |
|---|---|
| Sodium chlorophyllin (water-soluble) | .1 |
| Ferric-potassium-ammonium-citro-phosphate | 1.0 |
| Zinc sulphate | .1 |
| Manganous sulphate | .1 |
| Water sufficient to make 100 parts of solution | |

The ingredients are dissolved in the water and the resulting solution may be used as a spray.

*Example 10*

| | Parts |
|---|---|
| Sodium chlorophyllin (water-soluble) | .01 |
| Zinc manganous chloride | .1 |
| Water | 99.8 |

The ingredients are dissolved in the water and the resulting solution may be used as a spray.

Considerable modification is possible in the selection of the metallic salt of the parent chlorophyll structure and of the compound or compounds furnishing the iron, zinc, or manganese, as well as in the relative proportions of the compounds in the composition and in the method of application of the composition to the plant, without departing from the essential features of the invention.

I claim:

1. A composition for the treatment of chlorosis in plants, comprising a mixture of two distinct compounds one of which is a water-soluble metallic salt of the parent structure of chlorophyll and the other of which is a water-soluble compound furnishing an element selected from the group consisting of iron, zinc, and manganese.

2. A solid composition for the treatment of chlorosis in plants, comprising a mixture in solid form of two distinct compounds one of which is a water-soluble metallic salt of the parent structure of chlorophyll and the other of which is a water-soluble compound furnishing an element selected from the group consisting of iron, zinc, and manganese.

3. The product of claim 2 wherein the composition contains a water-soluble iron compound.

4. The product of claim 2 wherein the composition contains ferric-potassium-ammonium-citro-phosphate.

5. A solid composition for the treatment of chlorosis in plants, comprising a co-solidified mixture of sodium chlorophyllin and ferric-potassium-ammonium-citro-phosphate.

6. The product of claim 5 wherein the sodium chlorophyllin is present between about 0.5% and about 5.0%, based on the weight of the ferric-potassium-ammonium-citro-phosphate.

7. An aqueous solution for the treatment of chlorosis in plants, comprising a water solution of two distinct compounds one of which is a water-soluble metallic salt of the parent structure of chlorophyll and the other of which is a water-soluble compound furnishing an element selected from the group consisting of iron, zinc, and manganese.

8. The product of claim 7 wherein there is present in the solution a water-soluble iron compound.

9. The product of claim 7 wherein there is present in the solution ferric-potassium-ammonium-citro-phosphate.

10. The method of treating chlorosis in plants, which comprises applying to the plant an aqueous solution of a water-soluble metallic salt of the parent structure of chlorophyll and a water-soluble compound furnishing an element selected from the group consisting of iron, zinc, and manganese.

SEBASTIAN B. MECCA.

REFERENCES CITED

The following references are of record in the file of this patent:

UNITED STATES PATENTS

| Number | Name | Date |
|---|---|---|
| 2,120,667 | Gruskin | June 14, 1938 |

FOREIGN PATENTS

| Number | Country | Date |
|---|---|---|
| 436,791 | Great Britain | Oct. 14, 1935 |

OTHER REFERENCES

Serial No. 310,759, Ernesto Alberizzi (A. P. C.), pub. May 4, 1943.

Pharmaceutical Abstracts, vol. 7, page 152, article on "Carovit," pub. May 1941.